United States Patent [19]
Doucerain et al.

[11] 3,778,017
[45] Dec. 11, 1973

[54] APPARATUS FOR JOINT MANUFACTURE

[75] Inventors: Jacques Doucerain; Bernard Baumann, both of Paris, France

[73] Assignees: Cebal GP, Paris; Societe De Traitements Electrolytiques Et Electrothermiques, Massy, both of France; part interest to each

[22] Filed: Dec. 13, 1971

[21] Appl. No.: 207,696

Related U.S. Application Data

[63] Continuation of Ser. No. 842,968, July 18, 1969, abandoned.

[30] Foreign Application Priority Data
July 23, 1968  France .............................. 68160224

[52] U.S. Cl.................. 249/78, 249/91, 249/96, 425/174, 425/123, 425/124, 29/526
[51] Int. Cl............................................ B22d 27/02
[58] Field of Search................... 425/123, 124, 407, 425/174; 29/460, 526, 462; 264/261, 262; 249/78, 91, 96, 68

[56] References Cited
UNITED STATES PATENTS

| | | | |
|---|---|---|---|
| 1,318,404 | 10/1919 | Penn | 249/67 |
| 2,321,340 | 6/1943 | Waterburg | 249/96 X |
| 2,451,912 | 10/1948 | Bradley | 425/123 |
| 2,465,276 | 3/1949 | Ryder | 425/123 |
| 2,914,109 | 11/1959 | Hsu et al. | 425/DIG. 13 |
| 2,984,887 | 5/1961 | Thiess | 249/78 |
| 2,991,213 | 7/1961 | Williams | 29/526 UX |
| 3,233,013 | 2/1966 | Jaeger | 425/DIG. 13 |
| 3,293,694 | 12/1966 | Taylor, Jr. | 425/123 |
| 3,439,732 | 4/1969 | Andreoli | 249/91 X |
| 3,463,845 | 8/1969 | DePass et al. | 425/129 X |

Primary Examiner—Robert L. Spicer, Jr.
Attorney—McDougall, Hersh, Scott & Ladd

[57] ABSTRACT

A plastic joint and apparatus for its manufacture which includes a first molding portion comprising a base supporting a body which can be displaced relative to said base, spring means biasing the body against the base and molding means being movable with respect to the base in response to displacement of the body, and a second molding portion comprising a base plate having a molding groove carrying a channel member of an electrically conductive material and induction heating means to heat the channel member to reduce a blank of a thermoplastic material contained therein, whereby the thermoplastic material is displaced between a gap between sheets of a rigid material to form a continuous closed joint body between the sheets of rigid material, the edges of the sheets being in molded engagement in continuous grooves in the joint body.

9 Claims, 3 Drawing Figures

INVENTORS
JACQUES DOUCERAIN · BERNARD BAUM
BY
McDougall, Hersh, Scott & Ladd ATTY

APPARATUS FOR JOINT MANUFACTURE

This is a continuation, of application Ser. No. 842,968, filed July 18, 1969, now abandoned.

This invention relates to plastic sealing joints between sheets of rigid materials and to apparatus for the manufacture of such joints.

Various types of plastic joints between two sheets of metal or similar rigid materials, such as those formed either by molding or by folding one of two elements of a previously molded shape upon each other. However, such methods entail complicated apparatuses, are costly to operate and do not lend themselves to production line techniques.

It is accordingly an object of the present invention to provide a plastic sealing joint and apparatus for its manufacture which overcomes the foregoing deficiencies.

It is another object of the present invention to provide a plastic joint between two rigid sheets of material and apparatus for its manufacture which is simple, inexpensive and lends itself to production line use.

It is yet a further object of the invention to provide a sealing joint and apparatus for its manufacture which is capable of use in conjunction with a central panel and an edge member of a metal container.

These and other objects and advantages of the invention will appear hereinafter, and for purposes of illustration and not of limitation, an embodiment of the invention is shown in the drawing, in which.

The invention is addressed to a joint and apparatus for its manufacture wherein the apparatus generally comprises a mold formed of an upper portion and a lower portion. The upper portion comprises a base or intermediate portion upon which is mounted by at least one centering pin and a plurality of support pins a body which is moveable relative to and is spring biased against the base portion. The base may be provided with apertures to receive the support pins of the body portion, to which is fixed a molding ring adapted to be displaced vertically with respect to the base.

The lower portion of the mold is provided with an annular groove positioned in line with the molding ring of the base which is adapted to receive a channel member constructed of an electrically and thermally conductive material, and with induction heating means for heating the channel member in the annular groove whereby a thermoplastic material can be reduced to a plastic state.

Thus, in the operation of the apparatus, two sheets of a rigid material, such as sheet metal, are positioned between the upper and lower portions of the mold with the space between the sheets of rigid material being aligned with the molding ring and the annular channel. The channel member is heated and the upper and lower portions of the mold are moved relative to each other whereby the thermoplastic material, under pressure exerted by the molding ring, flows between the space between the rigid sheets to form an annular seal therebetween after the thermoplastic material has cooled.

The resulting joint comprises a continuous annular closed body of thermoplastic material with two continuous grooves lying in the same plane on opposed lateral faces of the joint body into which the edges of the rigid sheets are embedded during the molding operation. The seal is both air and water tight, and is found to be particularly useful in sealing a central panel and an edge element in metal containers, and more particularly in the so-called "easy-open" tins in which the central panel may be stripped from the remainder of the container without the need for special tools such as a can opener.

Figure 1:
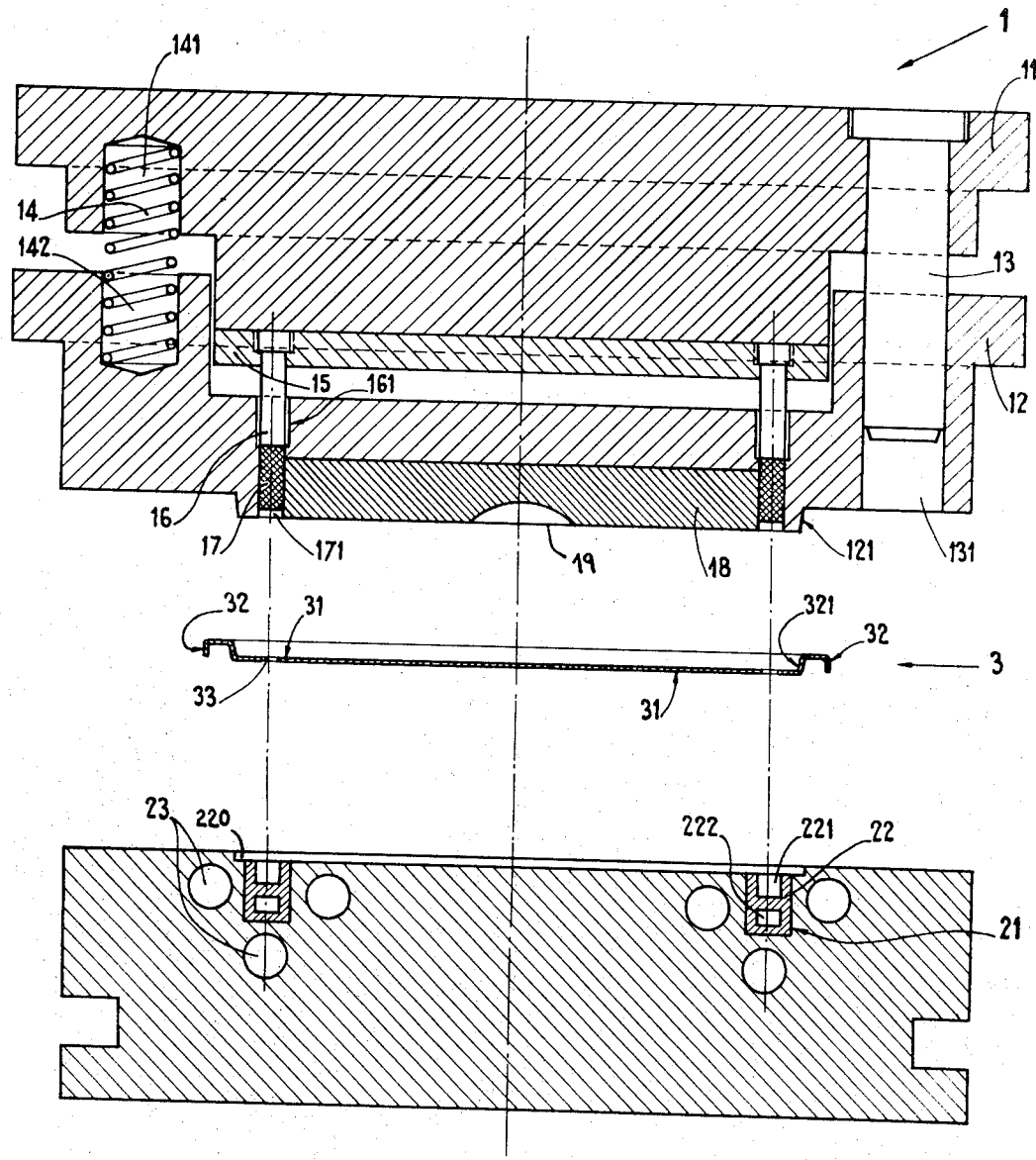
FIG. 1 is a vertical cross sectional view of one embodiment of the apparatus of the invention.

Referring to the drawing for a better understanding of the present invention, there is shown in FIG. 1 a sealing apparatus comprising an upper molding portion 1 and a lower molding portion 2 with the sheets of rigid material, preferably metal material, to be joined collectively referred to as 3.

The upper molding portion 1 generally comprises a mold body 11 which is provided with at least one centering pin 13 and a plurality of support pins 16 which can be formed either by studs threadably engaged with body 11, or, as illustrated in FIG. 1, by screws threaded on their upper end so as to be threadably engaged with a counterplate 15 fixed to the lower face of body 11. Body 11 is also provided with a recess 141 adapted to receive a portion of the length of a calibrated spring 14.

Positioned below body 11 is a base member 12, which is provided with at least one aperture 131 to receive the lower portion of centering pin 13, and a recess 142 to receive the lower portion of spring 14 extending beyond recess 141 of body 11. Thus, body 11 is biased from base member 12 by means of spring 14, and is moveable relative to base member 12 when spring 14 is subjected to compression.

Base 12 is provided with a plurality of apertures 161 to receive the lower portions of the plurality of support pins 16 extending beyond counterplate 15. Communicating with apertures 161 is an annular molding groove 171 in the lower face of base element 12 which is adapted to receive an annular molding ring 17 which may be fixed to the lower portion of support pins 16, whereby molding ring 17 can be displaced vertically in response to a force applied to body 11 and transmitted through support pins 16. The lower face of base element 12 may be provided, if desired, with a detachable face plate 18 which contains means, such as a suction cup 19, for retaining the sheet to be joined in a fixed position.

The lower mold portion or base plate 2 is a plate having an annular groove 21 which is aligned with molding groove 171 in the lower face of base element 12 when base plate 2 and base element 12 are in face to face relation. Annular groove 21 carries an annular channel member 22 made of an electrically conductive material, which comprises an annular chamber 221 adapted to receive a blank of a thermoplastic material to form the joint, and, if desired, cooling means 222 which may be a passage through which a coolant liquid may be circulated.

It is generally preferred that annular chamber be heated by induction. The induction heating means illustrated in FIG. 1 comprises a plurality of inductors 23 arranged in base plate 2 in the vicinity of annular groove 21, which causes channel member 22 to be heated by induction whereby the heat generated is transferred by conduction to the blank of thermoplastic material contained in annular chamber 221 of channel member 22. In this embodiment, at least base plate 2 is constructed of a material which is electrically insulating.

Figure 2:
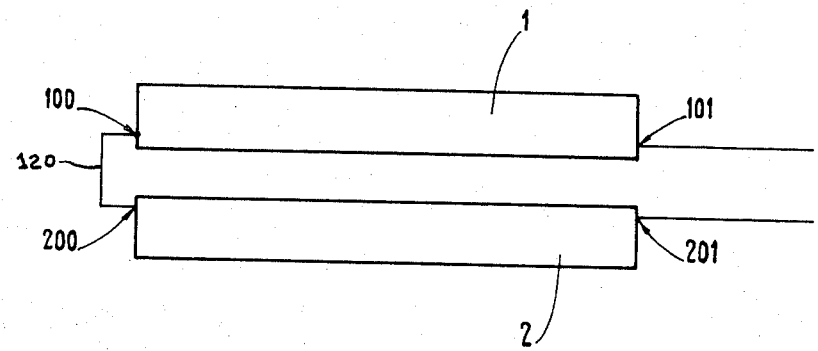
FIG. 2 is a schematic view of an alternate induction heating means.

Alternative heating means are schematically illustrated in FIG. 2, in which use is made of the techniques disclosed in applicants' copending application, filed on or about July 16, 1969, corresponding to French application 160,223, entitled "Mold and Method for Heating" and filed on even date herewith, wherein description is made of a mold and method for heating in which at least two mold elements defining a molding cavity are constructed of a material which is electrically conductive, and preferably magnetic, but are insulated at their adjoining faces. The two elements are connected by conducting means whereby a high frequency alternating current can pass only from one element to the other through the conducting means. The use of such currents causes heat to be generated by induction in a region adjacent to molding cavity thereby heating thermoplastic material therein.

In the embodiment illustrated in FIG. 2, both the upper and lower mold portions 1 and 2, respectively, are constructed of electrically conductive, and preferably magnetic materials, but are insulated from each other when in face to face relation, preferably by means of a material having electrical insulating properties, but are connected by way of conducting means 120 at points 100 and 200, respectively. The mold portions are connected to a source of high frequency alternating current (not shown) at points 101 and 201 diametrically opposite points 100 and 200 whereby the upper and lower mold portions have high frequency AC current passing through them in opposite directions. As a result, an induced current is established in the vicinity of the interior wall of the channel member which generates heat to reduce the blank of thermoplastic material to a plastic state for molding.

The frequency of the current usually depends upon the dimension and shape of the joint to be produced and the shape and size of the mold, but usually varies within the range of 100 kHz to 10 MHz.

The sheets of rigid material to be joined are illustrated in FIG. 1 as a central panel 31 and an edge element 32 having a continuous annular gap 33 therebetween which is aligned with molding groove 171 on the face of base element 12 and annular channel 21 on the face of base plate 2. It is also possible to have a central panel and edge element which are provided with a connecting bridge therebetween to hold the two pieces rigidly together. In this case, the annular gap is not continuous.

In the operation of the device of the present invention, a blank of a thermoplastic material having a generally rectangular cross section which fills the annular chamber 221 of annular groove 22, and the upper face of the blank extends beyond the upper edge of annular chamber 221 and also the face of base plate 2. The central panel may be positioned securely by use of suction cup 19 on the face of base element 12, and the edge element may be positioned by, for example, wedging an inward edge 321 against the wall 121 of a projection integral with base element 12.

The upper mold portion 1 is movable relative to lower mold portion 2 whereby the mold is closed by positioning the face of base element 12 in face to face contact with the face base plate 2, the latter being provided, if desired, with a recess 220 to compensate for the thickness of the materials being joined, with the central panel 31 and edge element 32 being engaged between these faces. The induction heating means is supplied with an electrical current, while the upper mold continues its downward displacement causing spring 14 to be compressed. At the same time, the downward displacement of the upper mold portion exerts a pressure, depending upon the calibration of spring 14, on molding ring 17 through support pins 16, whereby molding ring 17 transmits the pressure to the blank of thermoplastic material.

The thermoplastic material, under pressure, passes through the annular gap separating central panel 31 from edge element 32 to form a seal therein. The induction heating is stopped, and the joint is allowed to cool while the mold is still under the pressure exerted by molding ring 17.

It will be appreciated that the shape of the joint produced depends upon the shape of annular channel 221 and the lower face of molding ring 17. By varying the configurations of these elements, it is possible to produce a joint of any desired shape allowing for the reliefs necessary to remove the joint from the mold. It will also be appreciated that the cover produced may be fixed to the body of a container by crimping, and that the edge element can be an integral part of the body of the container. It will also be appreciated that while the apparatus is described with reference to an annular joint, it is also possible to utilize the concepts of this invention to produce a joint having other profiles, such as elliptical, square, rectangular, and linear.

Figure 3:
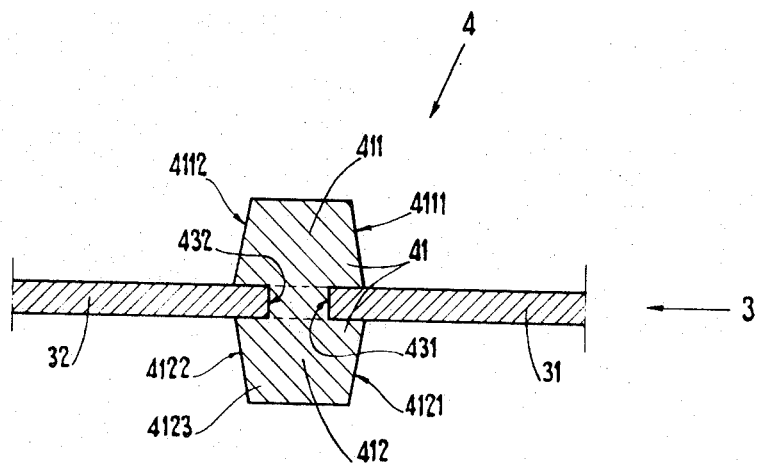
FIG. 3 is a cross sectional view of one embodiment of a joint according to the present invention.

The details of the joint produced by the apparatus illustrated in FIGS. 1 and 2 are best illustrated in FIG. 3, wherein it is shown that the joint comprises a continuous and closed joint body 41 of the thermoplastic material joining central panel 31 and edging element 32. The cross section of joint body 41 comprises two regular geometric shapes, shown in the drawing as trapezoids, the first of said shapes 411 lying generally on one side of the plane of the sheets joined and having faces 4111 and 4112 and the other shape 412 lying on the other side of this plane and having side faces 4122 and 4121. The trapezoidal portions 411 and 412 are separated by continuous grooves 431 and 432 in which the rigid sheets 31 and 32, respectively, are imbedded in a molded relationship. It will be noted that the cross section of the joint body has a greater dimension adjacent to the sheets 31 and 32 which is caused by the pressure of molding ring 17 upon the thermoplastic material during the molding operation.

As illustrated in this figure, both the upper and lower portions have the relief necessary to permit removal of the joint body from the mold. It will be appreciated that the cross section of each portion can be other than trapezoidal depending upon the configuration of the annular channel 221 and molding ring 17 as pointed out above, and upon the shape of the blank.

It will be understood that if a joint having a generally circular cross section is desired, the blank can be produced by molding a cylindrical tube which is then continuously cut. Similarly, the blank can comprise a single element which is placed, as described above, in annular channel 221, or it can be placed above the sheets to be joined 3 in, for example, groove 171. If desired, the blank can comprise two elements, one of which is placed in annular channel 221 and the other in groove 171. It is also possible that groove 171 can be formed in the lower face of molding ring 17 instead of in the body of base element 12 as shown in the drawing.

The apparatus of the invention is depicted in FIG. 1 in its most natural operating position, and the terms upper mold portion and lower mold portion relate to that portion. It will be understood, however, that the apparatus may be operated in any position, and particularly the inverted position, in which case the terms are reversed.

It will be apparent to one skilled in the art that the apparatus and joint produced thereby represent a significant improvement wherein a simple but effective joint can be produced by an apparatus which lends itself for use in mechanized production line techniques.

It will be understood that various changes may be made in details of construction and operation without departing from the spirit of the invention, especially as defined in the following claims.

We claim:

1. Apparatus for the manufacture of molded joints between sheets to be joined comprising a first mold portion comprising a base having a surface forming a face of said first mold portion, said base defining an annular groove, an annular molding ring movably mounted in said annular groove, a body mounted for displacement relative to said base, means to support said body on said base, spring means on said body to maintain said molding ring outwardly from said surface; a second mold portion comprising a base plate having a face, said base plate having a molding groove corresponding to said molding ring, a channel member positioned in said molding groove, induction heating means adjacent to the entire channel member to heat said channel member to reduce a thermoplastic material to a flowable state; and means to displace at least one of said mold portions relative to the other to position said first and second mold portions in face to face relation, and means to displace said body toward said base to overcome the force of said spring means whereby said molding ring is displaced toward said channel member to cause the thermoplastic material to flow outwardly between the sheets to be joined to form a joint therebetween.

2. Apparatus as defined in claim 1 wherein said means to support said body on said base includes at least one centering pin on said body and an aperture on said base, said aperture being adapted to receive said pin.

3. Apparatus as defined in claim 1 wherein said means to support said body on said base includes a plurality of support pins and at least one aperture in said base, said aperture in said base being adapted to receive said support pins and said support pins being fixed to said molding ring to cause displacement of said molding ring when said body is displaced.

4. Apparatus as defined in claim 1 wherein the surface of said base includes means to affix at least one of the sheets to be joined to said surface.

5. Apparatus as defined in claim 1 wherein said channel member comprises an electrically conductive material.

6. Apparatus as defined in claim 1 wherein said induction means includes a plurality of conductors in said base plate adjacent to said molding groove, and means to supply a high frequency alternating current to said conductors.

7. Apparatus as defined in claim 6 wherein said base plate is constructed of an electrically insulating material.

8. Apparatus as defined in claim 1 wherein said first mold portion and said second mold portion are constructed of an electrically conductive material and are insulated at their faces.

9. Apparatus as defined in claim 8 wherein said induction means includes means for supplying a high frequency alternating current to said first mold portion and to said second mold portion and conducting means connecting said first mold portion with said second mold portion, whereby said current can pass from one of said first and second mold portions to the other only through said conducting means.

* * * * *